United States Patent Office 2,742,478
Patented Apr. 17, 1956

2,742,478

HALOGENATION OF PYRIDINES

Abraham Bavley, Brooklyn, and Morton Harfenist, Flushing, N. Y., assignors to Chas. Pfizer & Co., Inc., New York, N. Y., a corporation of Delaware No Drawing. Application April 21, 1952,
Serial No. 283,524

7 Claims. (Cl. 260—295)

This invention relates to the halogenation of pyridines, and more particularly, to an improved process for halogenating a 2,6-dihydroxypyridine in the 2,6 positions by treatment thereof with phosphorus oxychloride or phosphorus oxybromide to replace the hydroxyl groups with halogen.

It is well known that ordinary hydroxypyridines or pyridones can be halogenated readily under mild conditions of temperature and pressure, but that considerable difficulty is had with the halogenation of 2,6-dihydroxypyridines. In fact, the halogenation of 2,6-dihydroxypyridines has heretofore been accomplished under rather drastic conditions of temperature and pressure in closed systems. For example, 2,6-dihydroxypyridine-4-carboxylic acid, also known as citrazinic acid, has been chlorinated by treatment with phosphorus oxychloride at a temperature of about 190 to 200° C. in a closed vessel wherein pressures in the order of 650 pounds per square inch, and greater, are generated by the evolution of a large quantity of acidic and highly corrosive vapors, mainly hydrogen chloride. However, the reaction is quite impractical for commercial purposes in view of the equipment requirements to meet the high pressures, temperatures and corrosive influences involved.

It has now been found that the high pressures heretofore employed can be completely avoided by conducting the reaction in the presence of a tertiary amine. Thus, 2-6-dihydroxypyridine compounds are effectively chlorinated in accordance with this invention by heating the same with phosphorus oxychloride or phosphorus oxybromide and a tertiary amine, which both catalyzes the reaction and raises the boiling point of the mixture so that the reaction can be driven to completion at about atmospheric pressure. Although hydrogen halide gas is nevertheless liberated during this reaction, it can be simultaneously withdrawn from the system, since it is unnecessary to generate any substantial internal pressure in order to raise the temperature of the reaction mixture.

A variety of 2,6-dihydroxypyridines can thus be halogenated in accordance with this invention, including compounds which conform to the following general formula:

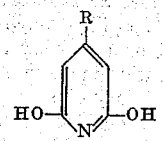

wherein R is hydrogen, alkyl, aryl, halogen or carboxyl. Illustrative examples of such compounds are 2,6-dihydroxypyridine; 2,6-dihydroxy-4-methyl pyridine; 2,6-dihydroxy-4-ethyl pyridine; 2,6-dihydroxy-4-chloropyridine; 2,6-dihydroxy-4-phenyl pyridine; and 2,6-dihydroxypyridine-4-carboxylic acid, or citrazinic acid. It is understood, however, that the above 2,6-dihydroxy pyridines can exist in a variety of tautomeric forms, such as the keto and enol forms, all of which are referred to herein simply as "dihydroxypyridines" for the sake of convenience.

The dihydroxypyridine compound is reacted with the phosphorus oxyhalide in an amount of about 2 to 4 mols, preferably 3 mols, of phosphorus oxyhalide per mole of dihydroxypyridine. The preferred halogenating agent is phosphorus oxychloride. The tertiary amine, in turn, is employed in an amount from 1 to 3 mols, preferably 2 mols, per mol of dihydroxypyridine compound. In general, an amount of amine sufficient to raise the boiling point of the reaction mixture to at least 125° C., preferably 125° to 180° C., is used, depending upon the amount of phosphorus oxyhalide present in the mixture. Suitable amines include aliphatic, aromatic, alicyclic and heterocyclic tertiary amines, illustrative examples of which are trimethyl amine; triethyl amine; tripropyl amine; dimethylaniline; N-methyl piperidine; N-ethyl piperidine; 2,4 lutidine; and the collidines, such as 2,4,6 trimethyl pyridine and its isomer methyl, ethyl collidine. Mixtures of amines are also employed to advantage, a commercially available mixed collidine fraction having been found particularly suitable. A coal tar-derived mixture of heterocyclic tertiary amines boiling in the range of 170° to 190° C. also proved to be effective for the purposes of this invention.

The invention will be described in more detail with particular reference to the halogenation of 2,6-dihydroxypyridine-4-carboxylic acid, or citrazinic acid, with phosphorus oxychloride. The citrazinic acid, phosphorus oxychloride and amine can be mixed in any convenient manner, such as by blending two of the ingredients, warming them and adding the third at a rate moderate enough to prevent a violent reaction. Thus, the phosphorus oxychloride can be blended with the amine and warmed to the reflux temperature, after which the citrazinic acid is added portionwise. A preferred method is to mix the citrazinic acid and phosphorus oxychloride first, warming the mixture to about 90° C. to 100° C., and then add the amine before a major amount of the hydrogen chloride has been evolved. The mixing and the reaction which follows are advantageously conducted in a vessel equipped with stirring means, a reflux condenser, and a jacket to maintain the appropriate temperature of the reaction mixture. Although refluxing is not necessary, it is preferred to reflux during mixing and during the initial stages of the reaction.

After mixing, the reaction is carried out by heating at a temperature ranging from about 125° to 180° C. Below this range the reaction proceeds too slowly, and above it the reaction becomes more difficult to control. A temperature of 140° to 150° C. is preferred for most purposes. The heating is continued for a period of about 2 to 18 hours until the reaction is complete. As stated, the hydrogen halide gas evolved during mixing and heating can be withdrawn from the system to avoid the high pressures which would otherwise be generated thereby.

Upon completion of the reaction, the reaction mass is cooled, preferably to a viscous liquid suitable for pouring. At this point, the 2,6-dichloropyridine-4-carboxylic acid is in the form of its acid chloride, which can be hydrolyzed in water to the acid. In lieu of hydrolysis, the crude reaction product can be treated to form esters or amides by reacting the same directly with an excess of an appropriate alkanol, or a primary or secondary amine.

The hydrolysis is effected by slowly pouring the reaction mass into water maintained preferably at a temperature of about 60° to 100° C. while stirring the same. Precipitation of the 2,6-dichloropyridine-4-carboxylic acid begins as soon as the acid chloride becomes hydrolyzed, at which time any excess phosphorus oxychloride and amine are also hydrolyzed to form salts of phosphoric acid and hydrochloric acid which remain in solution. After all of the reaction mass has been hydrolyzed, the mixture is cooled to a temperature sufficient to complete the crystallization of the dichloropyridine carboxylic acid. The crystalline product so obtained is then removed from the solution by filtration and washed with cool water, after which it is dried in air. Alternatively, the dichloropyridine carboxylic acid can be extracted from the acidic mixture with suitable water-immiscible solvents, such as chloroform, methyl isobutyl ketone, and the like. The amine is readily recovered from the acidic filtrate containing the salts thereof, by alkalizing the filtrate with a strong base, such as sodium hydroxide, and separating the insoluble amine released thereby.

The same procedure can be employed for the preparation of 2,6-dihalopyridine, or alkyl, aryl and halogen substituted 2,6-dihalopyridines, as above set forth. In such cases, where the pyridine ring contains no carboxyl substituent, hydrolysis of the halogenated pyridines per se is unnecessary. Nevertheless, it is preferred to treat the reaction mass with water as a convenient means to separate the desired 2,6-dihalopyridine products from the other products in the reaction mixture which are readily hydrolyzed.

The invention is further illustrated by the following examples.

Example I

One hundred gms. of dried citrazinic acid and 300 gms. of phosphorus oxychloride were placed in a one liter flask equipped with a reflux condenser and means for heating and stirring. The mixture was heated to the boiling point, about 93° C., whereupon hydrogen chloride gas was slowly evolved. After about 5 minutes, 132 gms. of redistilled commercial 2,4-lutidine were added during the course of about 19 minutes, near the end of which, the temperature rose spontaneously to 120° C. A considerable volume of hydrogen chloride gas was evolved after addition of the first portion of lutidine, and this gas was continuously removed from the system.

After addition of the lutidine, the reaction mixture was heated at a temperature maintained between 120° and 128° C. for a period of about 17 hours. Thereafter, the dark syrupy liquid resulting from the reaction was cooled and run slowly with rapid stirring into 300 cc. of warm water maintained at about 80° C. The mixture was stirred until completion of the hydrolysis, cooled below room temperature, and filtered to remove the product which was then washed with water and dried. Seventy-five gms. of crude 2,6-dichloropyridine-4-carboxylic acid, having a melting point of 200–204° C., were thus obtained. Upon standing of the filtrate, an additional 21 gms. precipitated out and were separated from the solution. The total quantity of 96 gms. of crude material so obtained corresponds to an overall yield of 77.5 percent.

Example II

Thirty-three gms. of 2,4-lutidine were added to a mixture of 25 gms. citrazinic acid and 75 gms. phosphorus oxychloride in a manner similar to that employed in Example I. The mixture was then heated at a temperature maintained between 138° and 153° C. for a period of 2½ hours. Thereafter, the resulting product was poured into a mixture of ice and water to hydrolyze the same, and the 2,6-dichloropyridine-4-carboxylic acid so produced was removed by filtration, washed with water, and dried. Twenty-five gms. of product melting at 198° to 205° C. were obtained, equivalent to a yield of 81 percent.

Example III

One hundred gms. of citrazinic acid, 300 gms. phosphorus oxychloride and 132 gms. 2,4-lutidine were mixed and reacted in accordance with the procedure of Example I, while maintaining the reaction temperature between 166° and 174° C. for 2 hours. After hydrolysis, filtration, washing, and drying of the product, as in Example I, 83.3 gms. of crude 2,6-dichloropyridine-4-carboxylic acid having a melting point of 183° to 193° C. were obtained.

Example IV

In like manner, 100 gms. of citrazinic acid were mixed with 300 gms. of phosphorus oxychloride and heated to 102° C. Thereafter, 88 gms. of 2,4-lutidine were added in the course of 12 minutes. The mixture was then heated at 141° to 150° C. for a period of 4½ hours. Upon cooling and further treating the product as in Example I, 75 gms. of crude 2,6-dichloropyridine-4-carboxylic acid, having a melting point of 200° to 203° C., were obtained. This represents a yield of 60.5 percent.

Example V

Seven hundred fifty gms. of phosphorus oxychloride were mixed with 330 gms. 2,4-lutidine in a reaction vessel, and 250 gms. citrazinic acid were added thereto over a period of ½ hour, while maintaining the temperature between 89° and 120° C. by cooling. After addition of the citrazinic acid, the mixture was heated at 150° to 162° C. for a period of 4 hours. Thereafter, the reaction mass was hydrolyzed by adding the same slowly to an ice water slurry with stirring, and a solid material was formed. This material was removed by filtration, dissolved in excess aqueous sodium hydroxide (5 percent), and the solution was also filtered to remove insoluble material. The aqueous alkaline filtrate was treated with charcoal, filtered again, and acidified with excess hydrochloric acid, which produced 167 gms. of a tan solid. The yield of 2,6-dichloropyridine-4-carboxylic acid thus obtained was 54 percent.

Example VI

Twenty-five gms. of citrazinic acid and 75 gms. of phosphorus oxychloride were mixed in a 500 ml. flask and 37 gms. of crude mixed collidines (Eastman Kodak No. T4815) were added thereto portionwise over a period of seven minutes, the temperature being maintained between 45° and 105° C. during the addition. The mixture was then heated to maintain the temperature between 147° and 160° C. for a period of 2½ hours. The crude 2,6-dichloropyridine-4-carboxylic acid chloride was hydrolyzed in warm water, filtered, dried and washed as in Example I to give 29 gms. of a tan to yellow solid melting between 187° and 198° C. This corresponds to a yield of 94 percent of the carboxylic acid thus produced.

Example VII

One hundred gms. of citrazinic acid were mixed with 300 gms. of phosphorus oxychloride in a 1 liter flask and heated to the reflux temperature of about 102° C. Thereafter, 125 gms. of triethylamine were added slowly over a period of 15 minutes. The mixture was then heated for 5 hours at 140° C., after which it was hydrolyzed and treated as in Example I to recover 103.6 gms. of a yellow-brown product, melting at 203–204° C. The yield of 2,6-dichloropyridine-4-carboxylic acid was 84 percent.

From the foregoing, it can readily be seen that this invention provides a more economical and efficient process for halogenating 2,6-dihydroxypyridine compounds. Thus, such compounds can be prepared in accordance with the present invention in ordinary acid resistant equipment, such as an ordinary glass lined autoclave, without the need for specially designed equipment which would be required if prior art methods of synthesis were employed. The products obtained are useful as intermediates in organic synthesis, 2,6-dichloropyridine-4-carboxylic acid being particularly useful in the preparation of isonicotinic acid. Isonicotinic acid, in turn, can readily be converted to isonicotinic acid hydrazide, which has shown utility in the treatment of tuberculosis.

Resort may be had to such modifications and equivalents as fall within the spirit of the invention and the scope of the appended claims.

We claim:
1. A process for halogenating a 2,6-dihydroxypyridine in the 2,6 positions, which comprises heating a mixture of (1) a dihydroxypyridine having the formula:

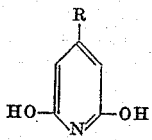

wherein R is selected from hydrogen, methyl, ethyl, phenyl, carboxyl and halogen, (2) a halogenating agent selected from phosphorus oxychloride and phosphorus oxybromide, and (3) a tertiary amine selected from the group consisting of trialkyl amines and dialkyl monocyclic aryl amines in which the alkyl groups contain no more than 3 carbon atoms, N-lower alkyl piperidines, mono-, di-, and tri-lower alkyl piperidines and mixtures thereof, at a temperature from about 125° to 180° C.

2. A process for halogenating a 2,6-dihydroxypyridine in the 2,6 positions, which comprises heating at a temperature from about 125° to 180° C. a mixture of (1) a dihydroxypyridine having the formula:

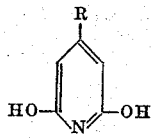

wherein R is selected from hydrogen, methyl, ethyl, phenyl, carboxyl and halogen, (2) a halogenating agent selected from phosphorus oxychloride and phosphorus oxybromide, and (3) a tertiary amine selected from the group consisting of trialkyl amines and dialkyl monocyclic aryl amines in which the alkyl groups contain no more than 3 carbon atoms, N-lower alkyl piperidines, mono-, di-, and tri-lower alkyl piperidines and mixtures thereof in an amount sufficient to raise the boiling point of the mixture to between 125° and 180° C.

3. A process for halogenating a 2,6-dihydroxypyridine-4-carboxylic acid in the 2,6 positions, which comprises heating a mixture of citrazinic acid and a halogenating agent selected from the group consisting of phosphorus oxychloride and phosphorus oxybromide, in the presence of a tertiary amine selected from the group consisting of trialkyl amines and dialkyl monocyclic aryl amines in which the alkyl groups contain no more than 3 carbon atoms, N-lower alkyl piperidines, mono-, di-, and tri-lower alkyl piperidines and mixtures thereof, and at a temperature from about 125° to 180° C.

4. A process for preparing 2,6-dichloropyridine-4-carboxylic acid which comprises heating at a temperature from about 125° to 180° C. a mixture of citrazinic acid, phosphorus oxychloride, and a tertiary amine selected from the group consisting of trialkyl amines and dialkyl monocyclic aryl amines in which the alkyl groups contain no more than 3 carbon atoms, N-lower alkyl piperidines, mono-, di-, and tri-lower alkyl piperidines and mixture thereof in an amount sufficient to raise the boiling point of the mixture to a temperature of between about 125° C. and 180° C., and recovering 2,6-dichloropyridine-4-carboxylic acid from the products so produced.

5. A process for preparing 2,6-dichloropyridine-4-carboxylic acid which comprises heating at a temperature from about 140° to 150° C. a mixture of citrazinic acid, phosphorus oxychloride, and 2,4-lutidine in an amount sufficient to raise the boiling point of the mixture to between about 140° C. and 150° C., simultaneously withdrawing from the system the hydrogen chloride gas liberated thereby, and recovering 2,6-dichloropyridine-4-carboxylic acid from the products so produced.

6. A process for preparing 2,6-dichloropyridine-4-carboxylic acid which comprises heating at a temperature from about 140° to 150° C. a mixture of citrazinic acid, phosphorus oxychloride, and triethylamine in an amount sufficient to raise the boiling point of the mixture to between about 140° and 150° C., simultaneously withdrawing from the system the hydrogen chloride gas liberated thereby, and recovering 2,6-dichloropyridine-4-carboxylic acid from the products so produced.

7. A process for preparing 2,6-dichloropyridine-4-carboxylic acid which comprises heating at a temperature from about 140° to 150° C. a mixture of citrazinic acid, phosphorus oxychloride, and a collidine in an amount sufficient to raise the boiling point of the mixture to between about 140° and 150° C., simultaneously withdrawing from the system the hydrogen chloride gas liberated thereby, and recovering 2,6-dichloropyridine-4-carboxylic acid from the products so produced.

References Cited in the file of this patent

Behrmann et al.: Berichte, vol. 17, pp. 2694–96 (1884).
Bittner: Berichte, vol. 35, page 2933 (1902).
Sell: J. Chem. Soc. (London), vol. 71, pp. 1068–73 (1897).
Meyer et al.: Monatshefte fur Chemie, vol. 36, pp. 734–5 (1915).
Maier-Bode: "Pyridine und seine Derivate," page 262 (1934).
Lovelt et al.: "Chem. Abst." (1929), vol. 23, p. 2976.
Meyer et al.: "Chem. Abst." (1916), vol. 10, p. 180.